(12) United States Patent
Lim et al.

(10) Patent No.: US 7,092,105 B2
(45) Date of Patent: Aug. 15, 2006

(54) METHOD AND APPARATUS FOR MEASURING THE THREE-DIMENSIONAL SURFACE SHAPE OF AN OBJECT USING COLOR INFORMATIONS OF LIGHT REFLECTED BY THE OBJECT

(75) Inventors: Ssang-Gun Lim, Taejeon (KR); Gee-Hong Kim, Taejeon (KR); Yi-Bae Choi, Taejeon (KR); Sang-Yoon Lee, Taejeon (KR)

(73) Assignee: Intek Plus Co., Ltd. (KR)

( * ) Notice: Subject to any disclaimer, the term of this patent is extended or adjusted under 35 U.S.C. 154(b) by 301 days.

(21) Appl. No.: 10/473,089

(22) PCT Filed: Oct. 31, 2001

(86) PCT No.: PCT/KR01/01840

§ 371 (c)(1),
(2), (4) Date: Apr. 1, 2004

(87) PCT Pub. No.: WO02/082009

PCT Pub. Date: Oct. 17, 2002

(65) Prior Publication Data

US 2004/0145753 A1    Jul. 29, 2004

(30) Foreign Application Priority Data

Apr. 6, 2001   (KR) .............................. 2001-18253

(51) Int. Cl.
*G01B 11/24* (2006.01)

(52) U.S. Cl. ...................... 356/601; 356/608; 356/602

(58) Field of Classification Search ................ 356/601, 356/602, 603, 608, 610
See application file for complete search history.

(56) References Cited

U.S. PATENT DOCUMENTS

| | | | |
|---|---|---|---|
| 5,039,868 A * | 8/1991 | Kobayashi et al. .... | 250/559.08 |
| 5,708,498 A * | 1/1998 | Rioux et al. ................. | 356/73 |
| 6,181,430 B1 | 1/2001 | Meyer et al. ............... | 356/495 |
| 6,327,374 B1 * | 12/2001 | Piironen et al. ............ | 382/108 |
| 6,341,016 B1 * | 1/2002 | Malione ..................... | 356/603 |
| 6,750,975 B1 * | 6/2004 | Takeda et al. .............. | 356/604 |
| 6,937,348 B1 * | 8/2005 | Geng .......................... | 356/603 |

FOREIGN PATENT DOCUMENTS

| | | |
|---|---|---|
| EP | 0 523 988 A1 | 1/1993 |
| JP | 7-229720 | 8/1955 |
| JP | 4-208515 | 7/1992 |

OTHER PUBLICATIONS

PCT International Search Report; International application No. PCT/KR01/01840; International filing date Oct. 31, 2001; Mailing date of Feb. 22, 2002.

* cited by examiner

*Primary Examiner*—Gregory J. Toasley, Jr.
*Assistant Examiner*—Roy M. Punnoose
(74) *Attorney, Agent, or Firm*—Cantor Colburn LLP

(57) ABSTRACT

A method and apparatus for measuring the three-dimensional surface shape of an object using color informations of light reflected by the object. The method and apparatus for measuring the three-dimensional surface shape of the object, in which a real-time measurement of the three-dimensional surface is performed by projecting a beam of light having color information onto the object and detecting color distribution information according to levels of the object, thereby obtaining level information of the object.

20 Claims, 14 Drawing Sheets

METHOD AND APPARATUS FOR MEASURING THE THREE-DIMENSIONAL SURFACE SHAPE OF AN OBJECT USING COLOR INFORMATIONS OF LIGHT REFLECTED BY THE OBJECT

TECHNICAL FIELD

The present invention relates to a method and apparatus for measuring the three-dimensional surface of an object using color informations of light reflected by the object, and more particularly to a method and apparatus for measuring the three-dimensional surface of the object, in which a real-time measurement of the three-dimensional surface shape is performed by projecting a beam of light having color information onto the object and detecting color distribution information according to levels on the surface of the object, thereby obtaining level information of the object.

BACKGROUND ART

As well known to those skilled in the art, a remarkably wide range of fields, from an inspection of a semiconductor pattern of a few nm, to a human body of hundreds of mm requires a measurement of a three-dimensional shape, and various measurement methods are being developed.

Particularly, interest in three-dimensional shape measurement is mainly directed to measurements of objects in a size range of tens of μm to a few mm in manufacturing process management, wherein representative examples are a protrusion of a PDP in a flat display industry, the shape of a solder paste on a PCB substrate, the shape of a ball-shaped solder paste in a BGA (Ball Grid Array) in a surface mount technology, and so forth.

The manufacturing processes of the objects in the above size range are aimed to mass production. Thus, tests and measurements for the control of manufacturing processes have to be done on a real time basis. Now, almost every manufacturing process uses a measurement device or tester on a basis of a two-dimensional vision test.

As manufactured products become high in performance, a defect occurring in a manufacturing process, which a conventional two-dimensional tester cannot overcome, has abruptly increased. This enhances a need for a real time measuring device and tester on a basis of three-dimensions as a means to overcome the defect.

A most commonly used method for a real time three-dimensional measurement operates on the principle of optical triangulation. The optical triangulation calculates the level of a predetermined point on the object by analyzing varied positions of a beam of light projected onto the point. The calculation uses a geometric relationship of a triangular form consisting of a light source for irradiating a light beam onto the point, detection means for detecting the light beam and the point on the object.

In the three-dimensional shape measurement device using the optical triangulation, the light source and detection means must be set to predetermined angles with respect to an axis perpendicular to a plane on which the object is laid. The angles have to be included as factors in the calculation.

Various types of three-dimensional shape measurement systems have been developed using optical triangulation as a basic measuring principle. The three-dimensional shape measurement systems are classified into three application types as follows, according to a measurable quantity of data at one time.

The first application type is a system that measures the level of a point on the object at one time. In more detail, the first system projects a beam of point light such as a laser onto a point within a predetermined region on the object and then applies the above described optical triangulation to a detected position of a light spot varied with respect to the level of the point on the object, thereby achieving the level of the point on the object.

This system requires mechanical scanner means such as a galvanometer capable of scanning a light beam onto the region on the object, or optical means such as an acousto-optic modulator, in order to measure a level distribution in the region on the three-dimensional surface of the object. The system has a disadvantage in that a complex electronic device is required to synchronize the scanner means with measurement means so as to achieve a real time measurement by using scanner means. The system has another disadvantage in that the system requires a relatively long time to measure a region over tens of mm, as it can measure only one point at one time.

The second application type is a system that measures one line on the object at one time. The representative example of the second system may be a slit beam measurement system. The system transforms a point light beam such as a laser to a line-shaped light beam, thereby irradiating the line-shaped light beam onto the surface of the object. The line-shaped light beam projected onto the surface is deformed according to a level distribution along a line on the surface. The image of the deformed line-shaped light beam is obtained by detection means, and then optical triangulation is applied to each point on the line, whereby the level of each point on the line is calculated.

The third application type is a system that measures a predetermined two-dimensional region on the three-dimensional surface of the object at one time. The third system transforms a white light beam to a multi-colored light beam such as spectrum through a prism or filter, thereby irradiating the multi-colored light beam onto the region on the object. First, the multi-colored light beam is projected onto a reference flat surface, and then a color distribution or hue value distribution on the reference flat surface is stored, where the hue value is unique for each color.

Next, the multi-colored light beam is projected onto a region on the object having a certain level distribution. The hue values of points on the region of the object are distributed with respect to levels of the points on the object, whereby the hue value distribution of the region on the object is different from that of the reference flat surface. The above described optical triangulation is then applied to different positions of a point in the region on the object and of a point on the reference flat surface having the same hue value as that of the point in the region on the object, whereby the level of the point in the region on the object can be calculated.

Another example of the third application type is the system that projects a specific pattern made of various colored lights in the forms of bands, different from the multi-colored light beam such as spectrum, onto a predetermined region of the three-dimensional shape, thereby measuring the shape according to changes in the colored light bands. The system of this example uses the same principle as the slit beam measurement system. However, the system of the example projects a plurality of colored light bands, which are sorted by colors, onto the surface region of the object so as to measure the surface region, while the slit beam measurement system measures only one line on the object at one time.

The third application type has an advantage in that the system can measure a predetermined region on the three-dimensional surface of the object at a time, but this type has a disadvantage in that the system has to reduce the size of the region to implement repeated measurements on a micro meter scale. The measurements have to be repeated discontinuously, when the surface of the object is larger than the region on which a beam of light is projected. This problem makes the system not suitable for a real time tester in a practical manufacturing process of products being continuously produced.

In all of above described conventional systems for measuring a three-dimensional shape using optical triangulation, respective detection means must have a two-dimensional area on which a light beam is focused after being projected onto a point on the object. The coordinates of a position in the area, on which the light beam is focused, depend on the level of the point on the object, whether it is high or low. These coordinates are detected by the detection means, whereby a level information of the point on the object can be determined.

The detection means have disadvantages in that they must be set to have a predetermined angle with respect to an axis perpendicular to a plane on which the object is laid, and a shading effect occurs, thereby creating a region on the object wherein the detection means fails to focus. The detection means has further disadvantages in that an adjustment is necessary when the angle with which the detection means are set is changed, and so measurement factors are shifted. In short, the conventional system for measuring a three-dimensional surface of an object using optical triangulation has a disadvantage in that the adjustment is necessary whenever the angle with which the detection means are set is changed, thereby causing an inconvenience in usage and requiring a long time for measurement.

DISCLOSURE OF THE INVENTION

Therefore, the present invention has been made in view of the above problems of the conventional optical triangulation, which are that detection means must have a two-dimensional area on which a beam of light is focused after being projected onto a point on an object, and must be set to be inclined to have a predetermined angle with respect to an axis perpendicular to a plane on which the object is laid. It is an object of the present invention to provide a method and apparatus for measuring the three-dimensional surface shape of an object, in which a real-time measurement of the three-dimensional surface shape can be performed at high speed.

In accordance with one aspect of the present invention, the above and other objects can be accomplished by the provision of a method for measuring the three-dimensional surface shape of an object using a color information of light reflected by the object, comprising the steps of: a), by multi-wavelength lighting means set above and to one side of the object, projecting a beam of light having a plurality of wavelengths onto the object; b), by detection means set above and to another side of the object, detecting a color distribution information with respect to levels of the object on which the light beam is projected at the step a); c), by calculation means, transforming the color information detected by the detection means at the step b) to a hue value; d), by calculation means, calculating a level information of two dimensions using the hue value obtained at the step c); and e) repeating the above steps while, by moving means, moving one of the object and detection means, and, by the calculation means, synthesizing calculated level informations of two-dimensions, thereby obtaining level information of the three-dimensional shape.

In accordance with another aspect of the present invention, there is provided an apparatus for measuring the three-dimensional surface shape of an object using a color information of light reflected by the object, comprising: at least one multi-wavelength lighting means for outputting a light beam having a plurality of wavelengths to the object, the multi-wavelength lighting means being set above and to one side of the object; at least one detection means for detecting a color distribution information with respect to levels of the object, where the light beam from the multi-wavelength lighting means is projected, the detection means being set above and to another side of the object; calculation means for transforming the color information detected by the detection means to a hue value and calculating a level information of two dimension by using the hue value, thereby calculating level information of the three-dimensional shape; and moving means for moving one of the object and detection means.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, preferred embodiments of the present invention will be described in conjunction with the annexed drawings.

Figure 1:
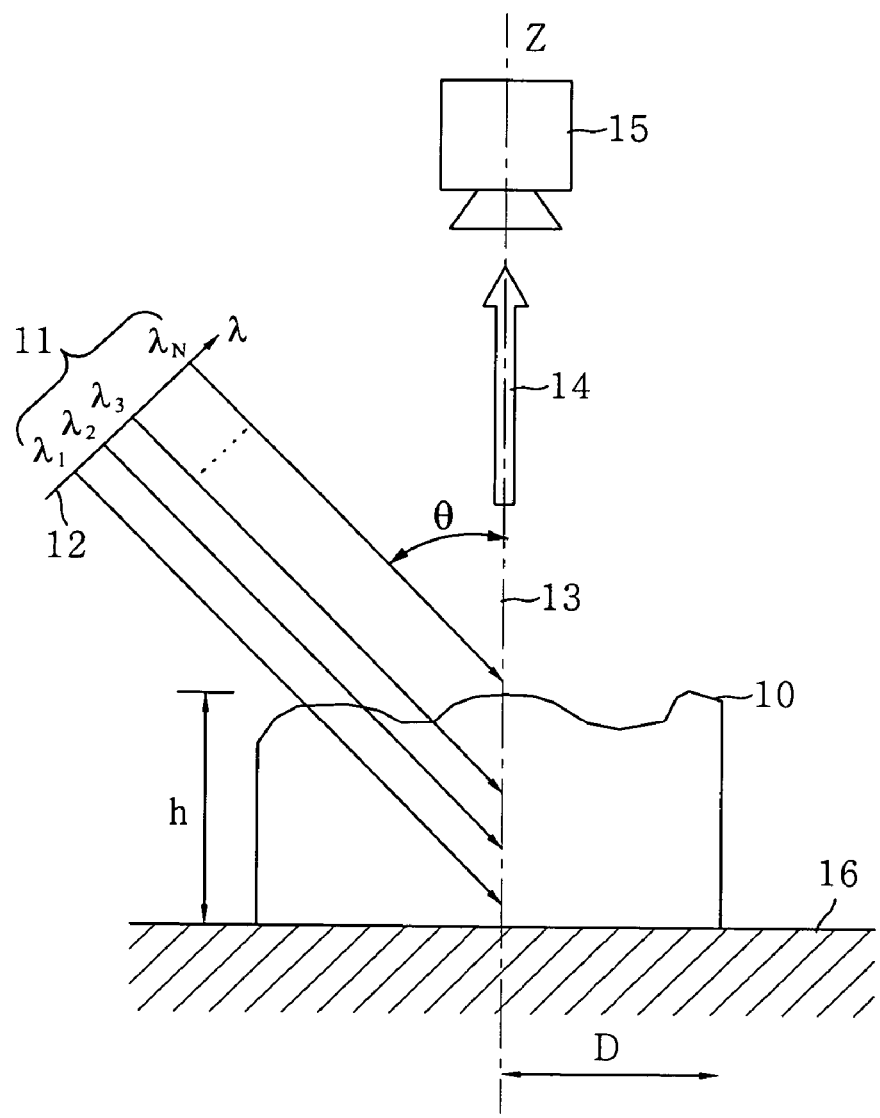
FIG. 1 is a diagram illustrating an algorithm for measurement in accordance with the present invention.

FIG. 1 is a diagram illustrating an algorithm for measurement in accordance with the present invention. Referring to the FIG. 1, a light beam 11 having a plurality of wavelengths, $\lambda_1$ to $\lambda_N$, is incident at a predetermined angle $\theta$ with respect to a perpendicular optical axis 13 onto an object 10 to be measured with a level distribution range of tens of μm to tens of mm. The incident light beam 11 has two or more wavelengths, which is separated into respective beam components with singular wavelengths incident on the object 10 according to levels, along a wavelength axis 12. The light beam with its wavelength bands in a visible region is shown as a spectrum. The number of the wavelengths of the light beam 11 distributed over the object 10 may increase or decrease in accordance with a profile of the object 10 and the wavelength axis 12.

When the light beam 11 is projected onto the object 10 at an angle θ with respect to the optical axis 13, respective beam components with wavelengths corresponding to a level of the object 10 are incident onto the object 10. The incident beam components are detected by detection means 15, wherein practical values obtainable through the detection means 15 are distribution values of red "R", green "G", and blue "B" of the obtained beam components. The distribution values of R, G, and B are not one-to-one correspondent with the level of the object 10, thus it is preferable to express the values of R, G, and B as a representative value so as to correspond directly to the level of the object. Thus, the present invention has introduced a hue value capable of representing the values of R, G and B as one value.

The hue value is physically a primary color among colors, and is expressed in mathematical terms with respect to a red color. Let's assume that a light beam with a plurality of wavelengths is incident to a predetermined point "P" on a z-axis of the object. A color distribution at the point "P" can be expressed by the following equation:

$$P = \begin{pmatrix} R \\ G \\ B \end{pmatrix} \quad (1)$$

Where, R, G and B of the equation 1 are respectively intensities of a red, green and blue color at the point "P" obtained by a color image sensor. A chromatic point "A" having the same intensity as that of the point "P" can be expressed by the following equation 2:

$$A = \begin{pmatrix} i \\ i \\ i \end{pmatrix}, \, i = (R+G+B)/3 \quad (2)$$

Here, the red color can be expressed by the following equation 3:

$$R = \begin{pmatrix} 1 \\ 0 \\ 0 \end{pmatrix} \quad (3)$$

Therefore, a hue value "H" at the point "P" can be expressed by the following equation 4, by using the equations 1 to 3:

$$H = \cos^{-1}\left[\frac{<P-A, R-A>}{(|P-A|)(|R-A|)}\right] \quad (4)$$

Where, "< >" of the equation 4 represents a scalar product.

A level "h" of the object and the hue value "H" calculated at the point "P" can be expressed by a functional relationship of the following equation 5:

$$h = f(H) \quad (5)$$

Where, "h" represents the level of the arbitrary point "P" on the object, and "H" represents the hue value obtained from the color information of the point "P". The equation 5 represents the relationship between the hue value "H" and the level "h" of the object in the form of a function. The function can be established as a monomial or polynomial expression with respect to the shape of the light beam, a used wavelengths area, the profile of the object and experimental values. However, it can be seen that the level of the object is determined solely by the hue value, and so there is no limit to the setting design determination of the incident angle of light. It is apparent that the equations established on the basis of the above facts are embraced within the scope of the invention defined in the claims appended below.

Figure 2:
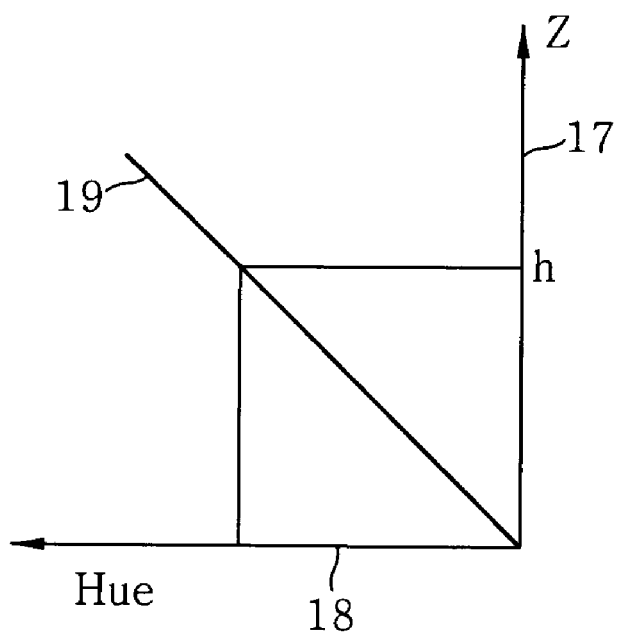
FIG. 2 is a graph showing a relationship between a level of a point on an object to be measured and a hue value of the point.

FIG. 2 is a graph drawn under the assumption that the hue value of the point P is linearly proportional to the level of the point P on the object, where a horizontal axis 18 represents a hue value, and a vertical axis 17 represents a level value. An oblique line 19 represents a hue curve. Referring to the graph, it can be seen that the hue value "Hue" is one-to-one correspondent with the level "h" of the object. The practical measurement system calculates the hue value of the point on the object to use this correction curve, thereby obtaining real time level information of the object.

In brief, when the light beam having a plurality of wavelengths is projected onto the object, as described above, the respective beam components with wavelengths are incident in accordance with the level of the object, and then the R, G and B values are detected from the wavelengths of the incident beam components, whereby the hue value "Hue" is calculated by using the detected values and then the hue graph is applied to this hue value, providing the level information of the object on which the light beam is projected.

The light source for projecting the light beam onto the object is of two types: one using a colored light by resolving a white light from a general white light source such as a tungsten halogen lamp into a multi-colored light such as a spectrum, and the other using a light composed of a plurality of light beams with single wavelengths. One skilled in the art may adapt these types to various circumstances as needed.

Figure 3:
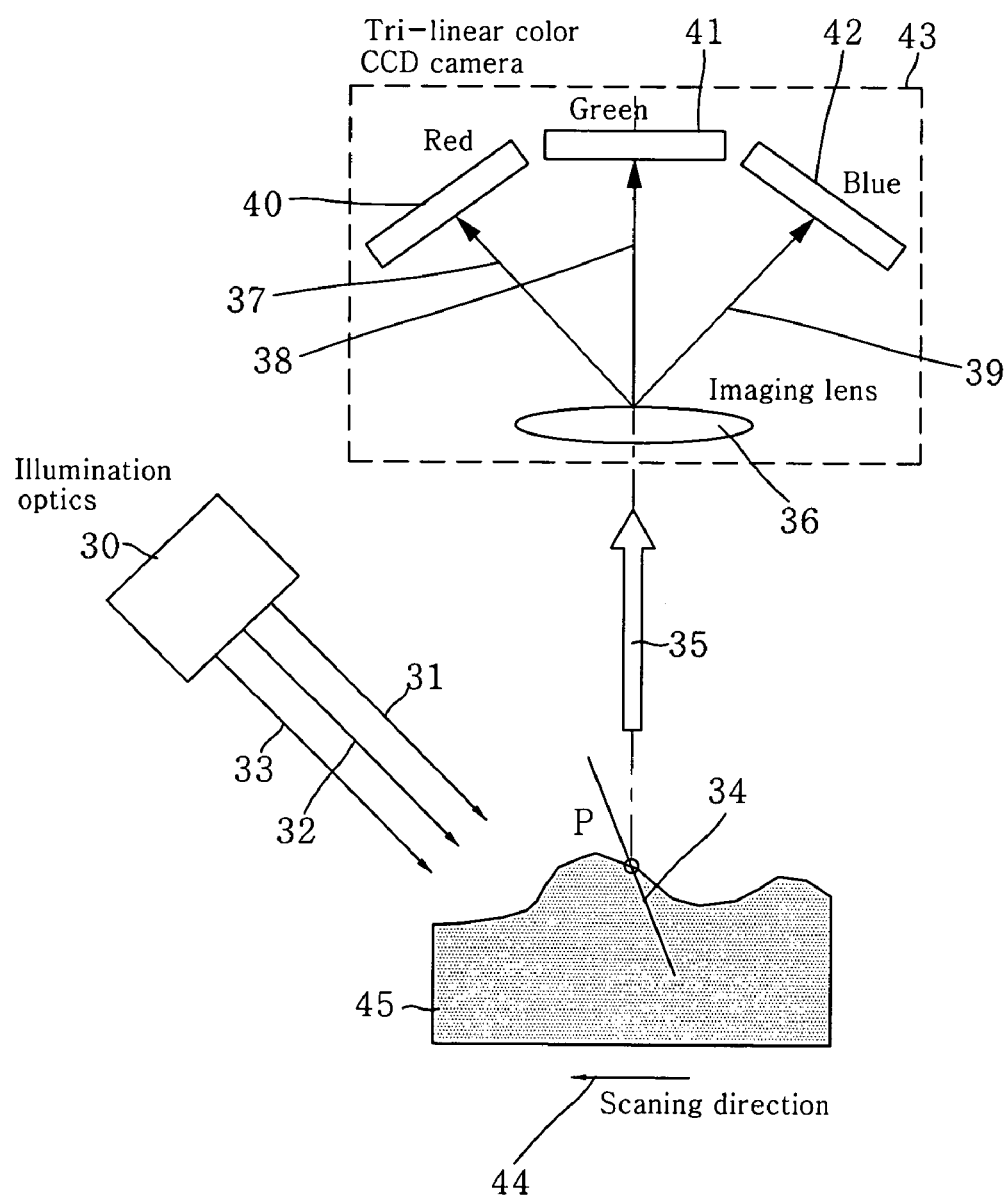
FIG. 3 is a diagram showing a first embodiment of a measurement apparatus in accordance with the present invention.

FIG. 3 is a schematic diagram showing a first embodiment of a real time measurement apparatus using color information in accordance with the present invention using the above principle.

As shown in FIG. 3, an outgoing beam of light from a light source 30, which has a plurality of wavelengths 31 to 33, is projected onto a predetermined region on an object 45 to be measured, and then a beam of light 35 reflected by a point "P" in the region is detected by detection means 43. The detection means 43 may include a region CCD camera (area CCD camera) for imaging a two dimensional region on the object. The present embodiment uses a tricolors line CCD camera.

The light beam 35 reflected by the object 45 is separated into three colored light beam components of red 37, green 38 and blue 39 upon being passed through an imaging lens optics 36, and then the colored light beam components are focused on sensors 40 to 42, respectively, whereby color distributions at the point "P" can be obtained. From the color distributions, hue values at the point "P" are calculated by a calculation unit (not shown), and then a two-dimensional level information of a line region 34 including the point "P", which is perpendicular to an optical axis 46, is obtained by using the correction curve of a hue value and level, which is corrected earlier. As the object 45 is moved in a direction 44 by a mechanical moving mechanism (not shown), a scanning advances as described above, whereby three-dimensional level information can be obtained. The light beam from the light source of FIG. 3 may be separated into two or infinite light beam components according to wavelengths, so as to be projected onto the object 45. The line 34 passing through the point P is perpendicular to each of the scanning direction 44 and the optical axis 40.

Figure 4A:
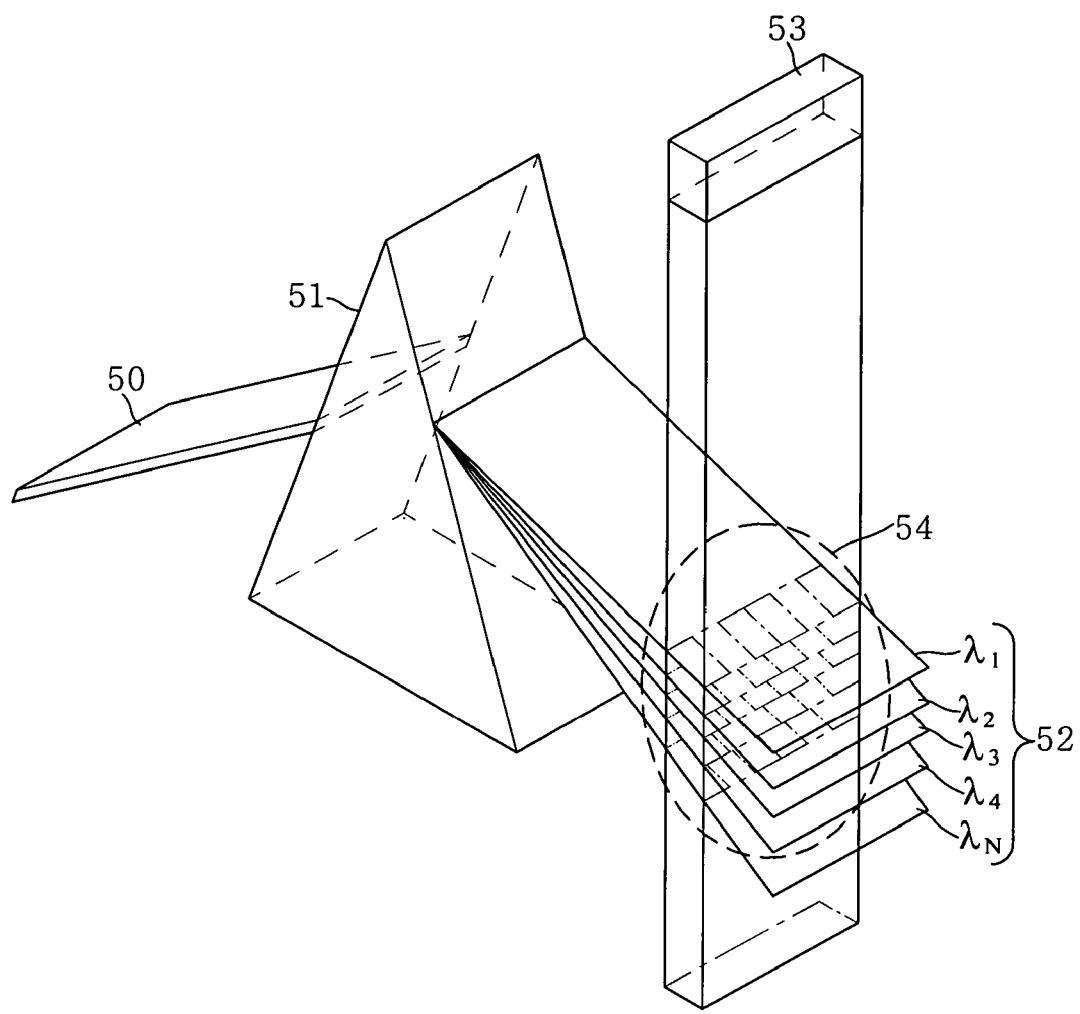
FIGS. 4a and 4b are views illustrating a second embodiment of the measurement apparatus in accordance with the present invention.
Figure 4B:
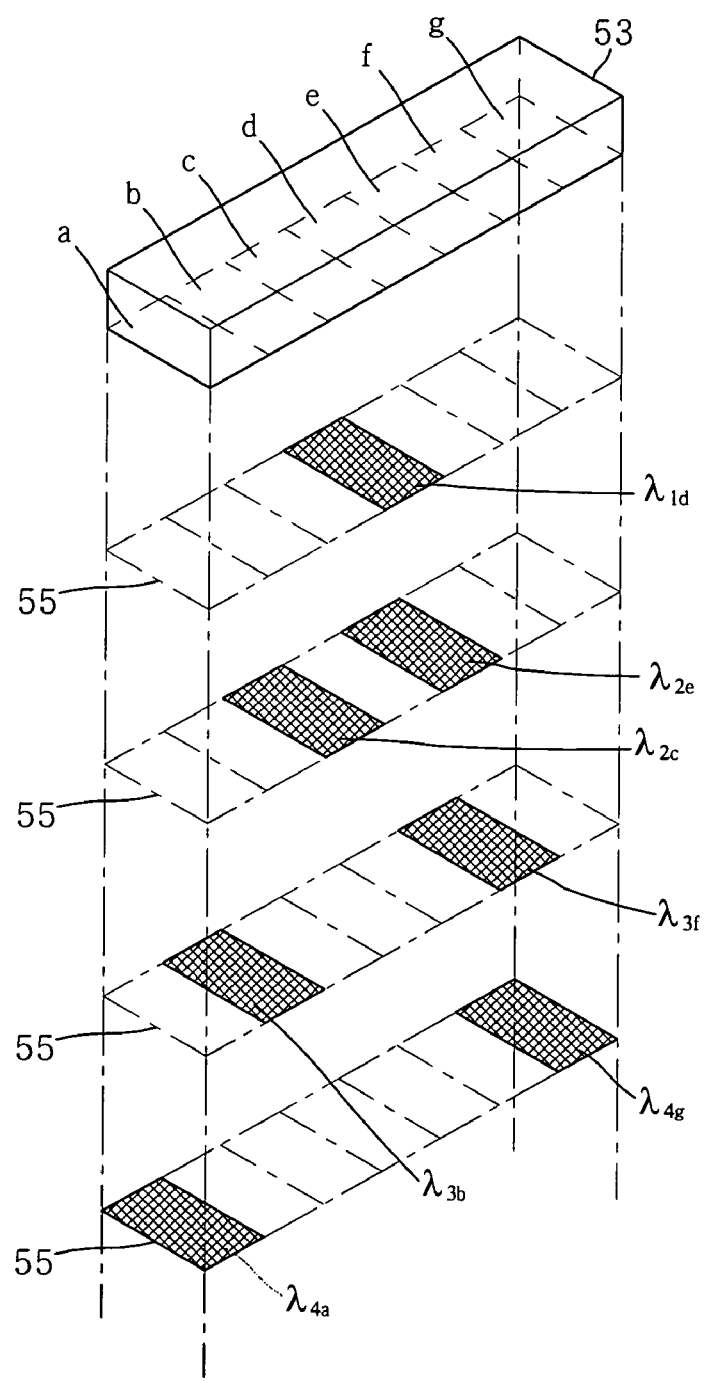

FIGS. 4a and 4b are views showing a second embodiment of the measurement apparatus in accordance with the present invention. As shown in FIGS. 4a and 4b, the apparatus for measuring the three-dimensional surface of an object comprises a prism 51 for separating a beam of white light into light beam components according to wavelengths to be projected onto the three-dimensional surface, and a tricolor line CCD camera 53 for obtaining a color information of the object.

As shown in FIG. 4a, the prism 51 separates the incident white light beam 50 according to differences between refractive indices of the wavelengths. The object is laid at a certain position (indicated by the numeral 54), to which the light beam components separated through the prism 51 are directed, and the line CCD camera 53 is set above the position 54, whereby the color information of colors distributed on the object is detected and then the level information of the object can be derived from the color information.

A more detailed description will be given hereinafter with reference to FIG. 4b.

Assuming that a optical pickup plane of the line CCD camera 53 consists of seven cells, "a" to "g", a region, in which the object can be sensed by the line CCD camera is divided into seven subregions. As shown in FIG. 4b, an object in the shape of a pair of steps is positioned at the region, in which the object can be sensed by the line CCD camera 53 in the following manner. The light beam component directed to a first wavelength region 55 is reflected to the cell "d" of the line CCD camera 53 and the light beam component directed to a second wavelength region 56 is reflected to the cells "c" and "e" of the line CCD camera 53. In the same manner, the light beam component directed to a third wavelength region 57 is reflected to the cells "b" and "f" of the line CCD camera 53 and the light beam component directed to a fourth wavelength region 58 is reflected to the cells "a" and "g" of the line CCD camera 53.

A hue value is derived from the wavelengths of the light beam components sensed by the line CCD camera, thus a level information of the object can be immediately obtained by using the functional relationship between a hue value and level of the object of equation 5. The line CCD camera 53 or object is moved in one direction so that level information of two-dimensional regions are obtained, whereby level information of the three-dimensional region can be obtained by synthesizing the level informations of two-dimensional regions.

Figure 5A:
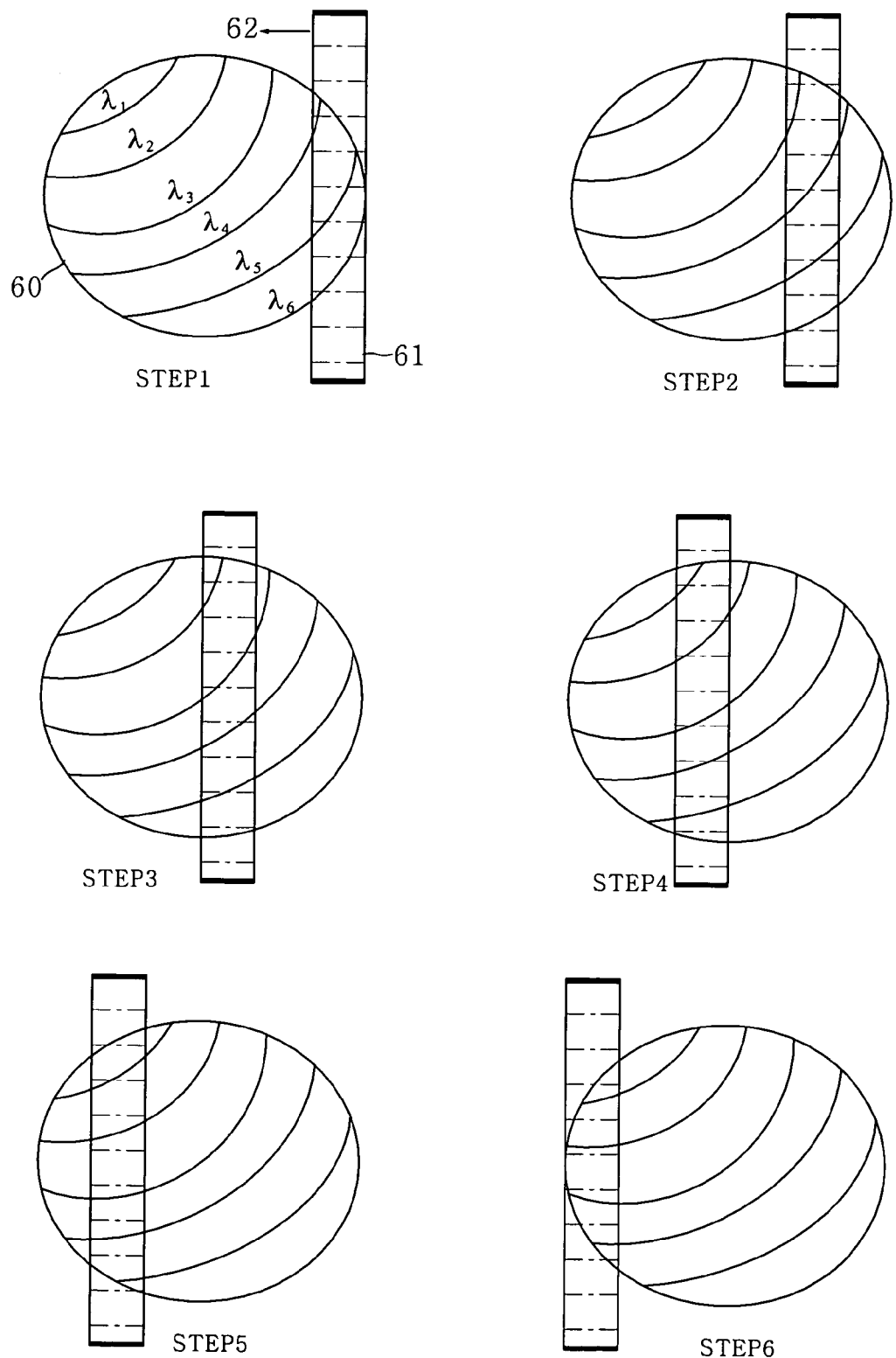
FIGS. 5a and 5b are views illustrating a process for obtaining a level information of a three-dimensional region using level information of two-dimensional regions on the object.
Figure 5B:
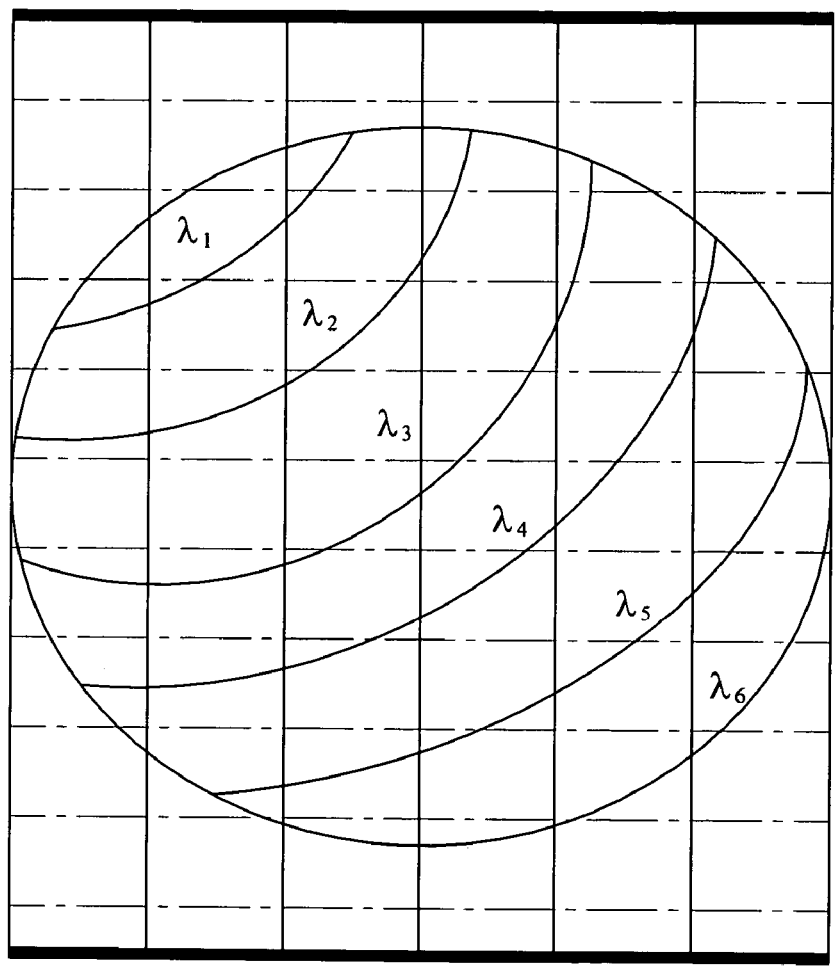

FIGS. 5a and 5b are views illustrating a process for obtaining level information of a three-dimensional region by using level information of two-dimensional regions. As a beam of light having a plurality of wavelengths is projected onto a ball-shaped object 60, as shown in FIG. 5a, respective light beam components with the wavelengths are distributed on the object in the form of a certain distribution pattern (see wavelength distribution pattern in step 1 of FIG. 5a) according to varied levels of the object 50. As the line CCD camera 61 is moved in a predetermined direction 62, color distributions are sensed by the cells of the line CCD camera at each step and analyzed, whereby level information of the whole ball-shaped object can be obtained.

Figure 6A:
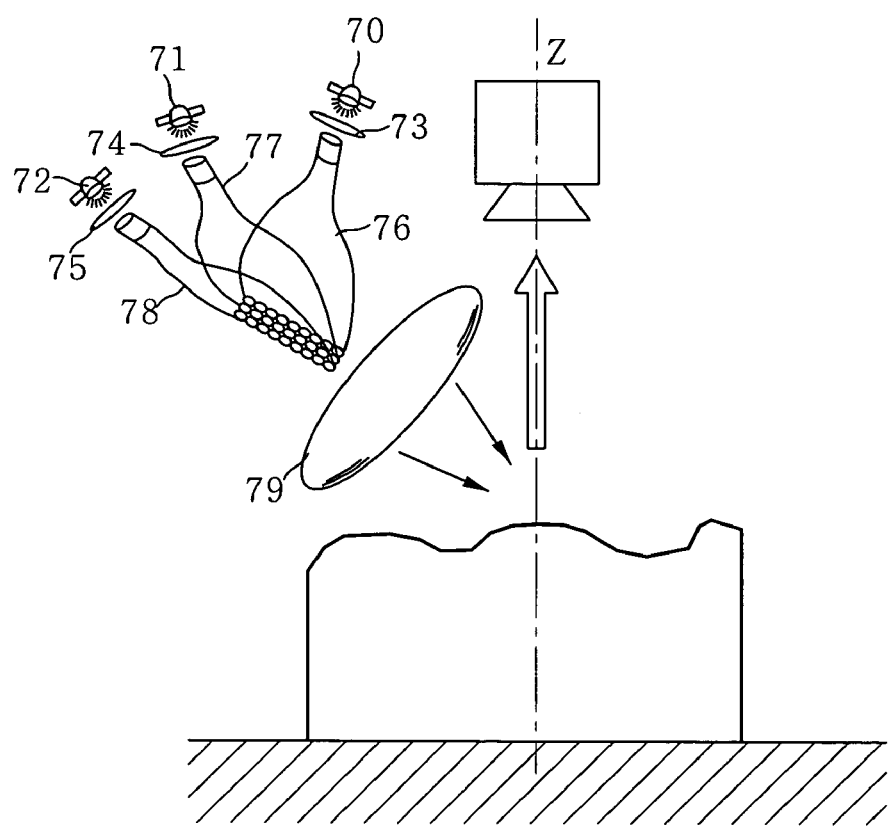
FIGS. 6a and 6b are views illustrating a third embodiment of the measurement apparatus in accordance with the present invention.
Figure 6B:
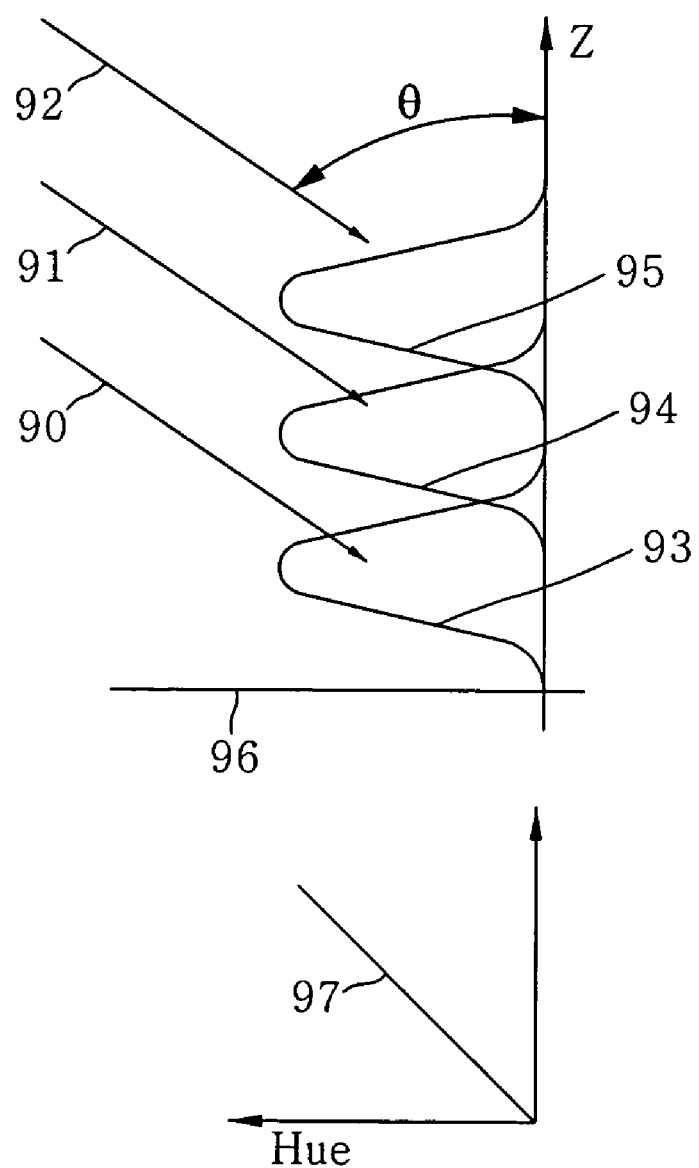

FIGS. 6a and 6b are views illustrating a third embodiment of the measurement apparatus in accordance with the present invention. FIG. 6a is a view showing an example of a beam of light composed of three single-wavelength beams of light.

As shown in FIG. 6a, three different single wavelength filters 73 to 75 are attached to distal ends of three identical light sources 70 to 72, respectively. The different single wavelength-beams separated by the single wavelength filters 73 to 75 are respectively outputted through light source guides 76 to 78. The light source guides 76 to 78 preferably include bundles of optical fibers, wherein ends of the bundles of the optical fibers are made to form a line so as to output a line-shaped light beam.

The light beams outputted through the light source guides 76 to 78 are projected onto an object to be measured through an imaging lens 79, wherein a magnification of the imaging lens 79 is modified so that the resolving power for a measurement can be adjusted to fit in a level distribution of the surface of the object. The number of the single-wavelength beams is determined according to a measurement environment and the profile of the object, and the light beam can be composed of a plurality of single-wavelength beams.

It can be envisaged that, depending upon a situation, the bundles of fibers 76 to 78 may be made to be separate such that the light beams transferred therethrough are projected onto the object in different directions. According to need, optical fibers may be separated into several bundles and thereafter a plurality of bandpass filters are arranged as single wavelength filters 73 to 75, with only one light source, thereby constructing an optical system. A tube laser or laser diode may be used for generating a light beam with a single wavelength, instead of the white light source such as the tungsten halogen lamp.

FIG. 6b is a view showing distribution curves of wavelengths when three single wavelength-beams are used as light beams 90 to 92. The wavelengths can be selected as desired, but a red wavelength of 600 nm, a green wavelength of 500 nm, and a blue wavelength of 400 nm are most effective for the light beams 90 to 92, respectively. Assuming that the light beams 90 to 92 are projected onto a certain line, which is perpendicular to a surface 96 to be measured, the light beams 90 to 92 have intensity distributions in the form of Gaussian Curves 93 to 95, respectively. By overlapping these distribution curves, a linear hue curve 97, as shown in FIG. 2, can be obtained, whereby the shape of the surface 96 can be measured.

Figure 7A:
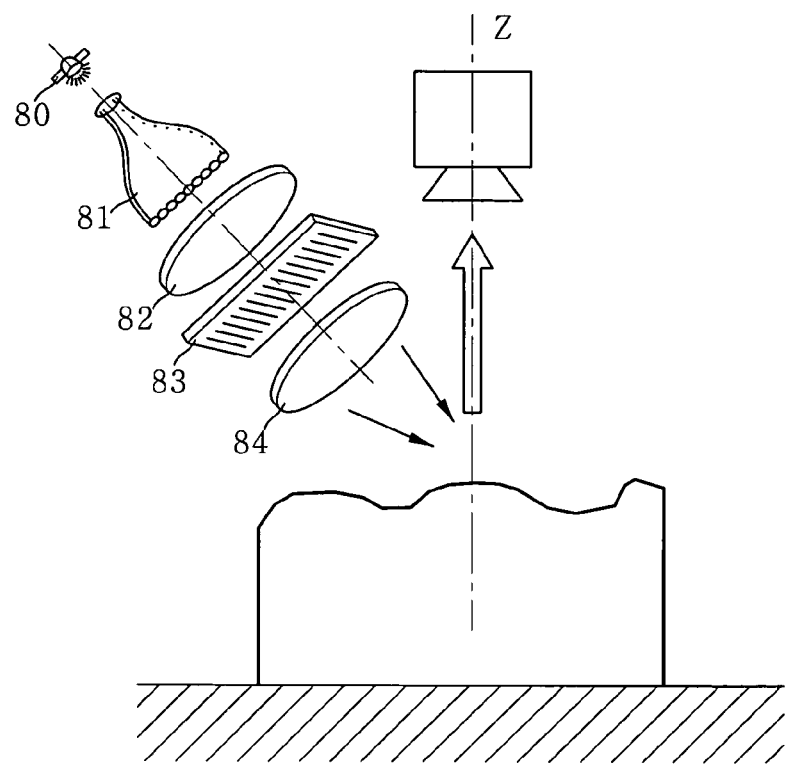
FIGS. 7a and 7b are views illustrating a fourth embodiment of the measurement apparatus in accordance with the present invention.
Figure 7B:
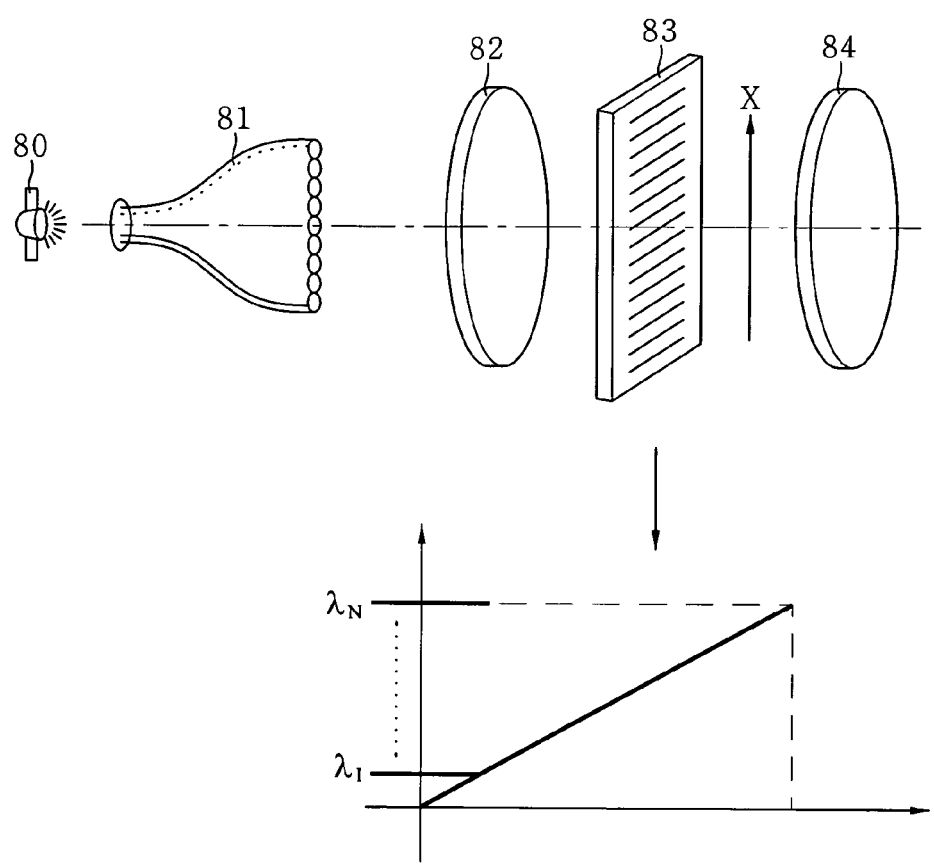

FIGS. 7a and 7b are views showing a fourth embodiment of a measurement apparatus in accordance with the present invention and, more particularly, FIG. 7a shows an example of a beam of light obtained using a LVWF (Liner Variable Wavelength Filter). A beam of white light generated from a light source 80 is outputted through a bundle of optical fibers 81, and then the output light beam is transformed to a beam of parallel light upon being passed through a parallel beams lens 82. The parallel light beam is incident onto the LVWF 83, whereby a beam of light having light beam components of linearly variable wavelengths is obtained. When the light beam transformed to have the light beam components of linearly variable wavelengths is projected onto an object to be measured through an imaging lens 84, the beam components with different wavelengths are incident onto the surface of the object according to a level distribution of the object. The variable beam components are projected onto the object in this way and then the above described measurement technique is applied, whereby the level of the object can be measured.

FIG. 7b is an enlarged diagram showing important parts of FIG. 7a. When a beam of white light is incident on the LVWF 83 from a side direction thereof, light beam components with different wavelengths along an x-direction of LVWF 83 are outputted. By using a commercially available LVEF, such as a SCHOTT VERIL Linear Variable Interference Filter of Edmund Industrial Optics Corporations as the LVWF 83, an optical system to form the light beam having a plurality of wavelengths can be easily constructed.

Figure 8A:
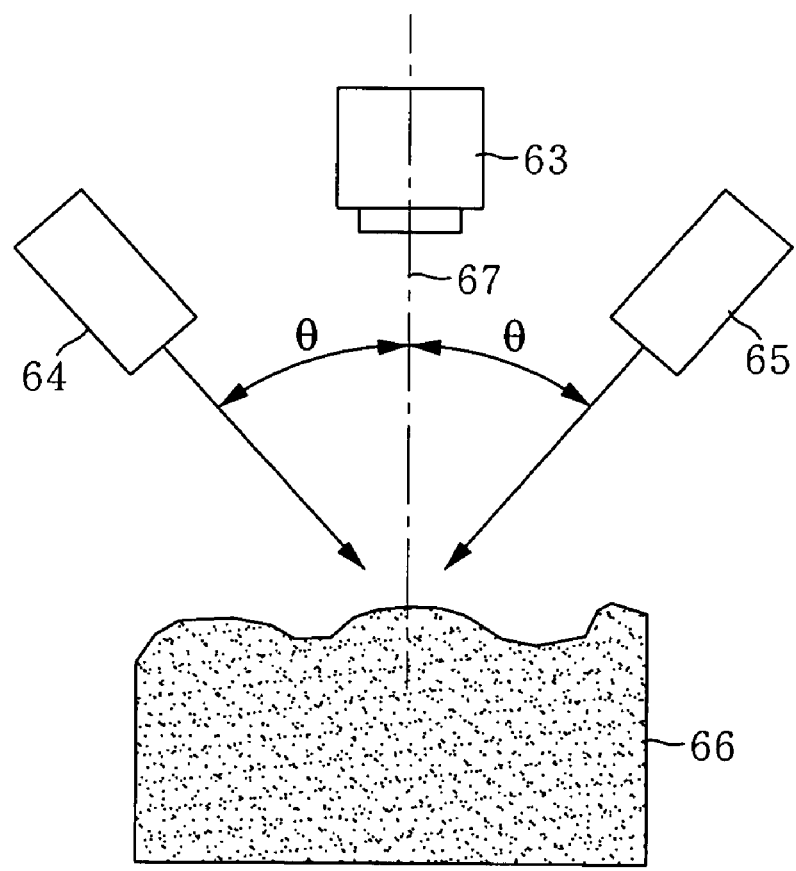
FIGS. 8a to 8c are views showing arrangements of light sources and detection means.
Figure 8B:
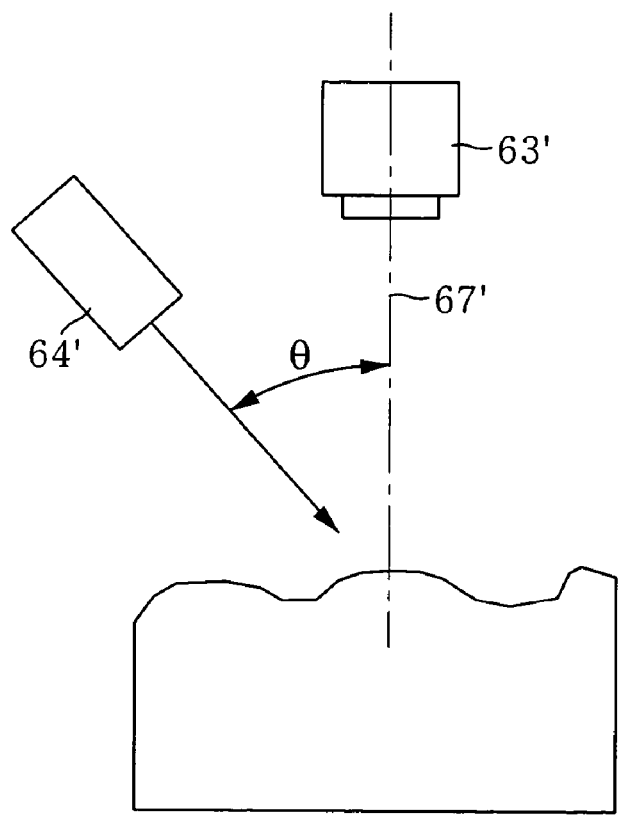
Figure 8C:
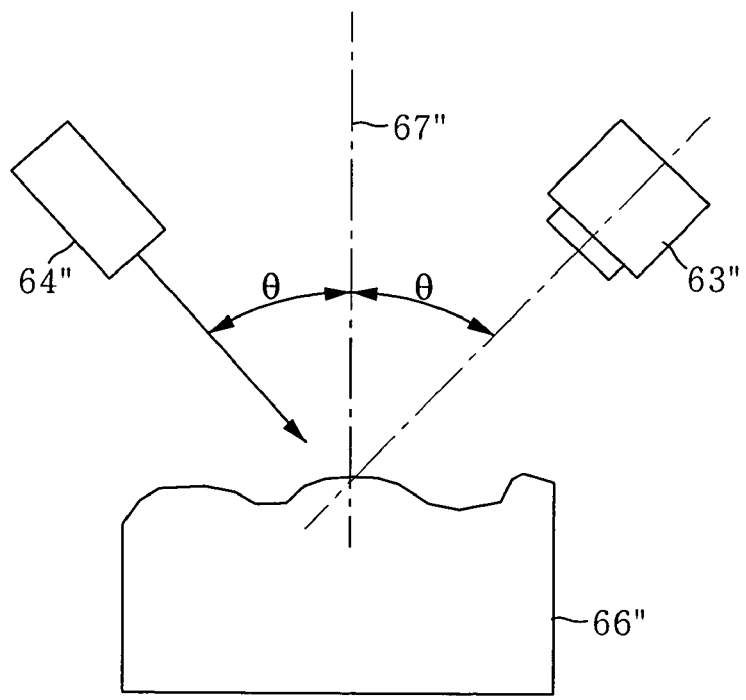

FIGS. 8a to 8c are views showing arrangements of light sources and detectors. Referring to FIG. 8a, the light sources A and B, 64 and 65, are separated and set to be inclined so that light beams therefrom are projected onto an object at the same angle with respect to an optical axis 67 of a CCD camera 63. The arrangements of light sources and the detectors may be varied: only one light source 64' may be used, as shown in FIG. 8b, and a light beam 64" and CCD camera 63" may be set to be inclined by a predetermined angle with respect to a perpendicular axis 67", as shown in FIG. 8c.

In each of these arrangements, a beam of light projected onto the object is transformed to have a plurality of wavelengths by using various types of color separation means, and a beam of light reflected by the object is focused on the tri-color line CCD camera, as described above. A process for obtaining level information of the object advances in the same manner as the above described technique.

INDUSTRIAL APPLICABILITY

As apparent from the above description, the present invention provides a method and apparatus capable of performing a real time measurement of an object. The method and apparatus project a beam of light having a plurality of wavelengths onto the object, and the light beam projected onto the object is detected by the CCD camera, detector, and then a hue value is calculated using the detected result, thereby obtaining level information of the object using the hue value. The present invention further provides the method and apparatus capable of achieving optimum measurement results, as the angle by which the detector is set does not function as a factor of the measurement in accordance with the present invention, so that the measurement apparatus can be constructed to set the detector at a most appropriate position according to the shape of the object.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for measuring the three dimensional surface shape of an object using color information of light reflected by the object, comprising the steps of:
   a), by multi-wavelength lighting means set above and to one side of the object, projecting a beam of light having a plurality of wavelengths onto the object;
   b), by detection means set above and to another side of the object, detecting color distribution information with respect to levels of the object on which the light beam is projected at the step a);
   c), by calculation means, transforming the color information detected by the detection means at the step b) to a hue value;
   d), by calculation means, calculating a level information of two dimensions using the hue value obtained at the step c); and
   e) repeating the above steps as, by moving means, moving one of the object and detection means, and, by the calculation means, analyzing calculated level information of two-dimensions, thereby obtaining level information of the three-dimensional shape.

2. The method as set forth in claim 1, wherein the light beam having a plurality of wavelengths projected onto the object is obtained by separating a beam of white light through a prism.

3. The method as set forth in claim 1, wherein the light beam having a plurality of wavelengths projected onto the object is obtained by separating a beam of light through a plurality of single wavelength filters.

4. The method as set forth in claim 1, wherein the light beam having a plurality of wavelengths projected onto the object is obtained by transforming a beam of light outputted from optical fibers through a parallel beams lens and LVWF (Linear Variable Wavelength Filter).

5. The method as set forth in claim 1, wherein the light beam projected onto the object is obtained by combining different single-wavelength beams respectively outputted from two or more tube laser/laser diodes.

6. An apparatus for measuring the three-dimensional surface shape of an object using color information of light reflected by the object, comprising:
   at least one multi-wavelength lighting means for outputting a light beam having a plurality of wavelengths to the object, the multi-wavelength lighting means being set above and to one side of the object;
   at least one detection means for detecting a color distribution information with respect to levels of the object on which the light beam from the multi-wavelength lighting means is projected, the detection means being set above and to another side of the object;
   calculation means for transforming the color information detected by the detection means to a hue value and calculating a level information of two dimensions by using the hue value, thereby calculating a level information of the three-dimensional shape; and
   moving means for moving one of the object and detection means.

7. The apparatus as set forth in claim 6, wherein the multi-wavelength lighting means includes a prism for separating an incident beam of white light into light beam components of single wavelengths according to refractive indices thereof.

8. The apparatus as set forth in claim 7, wherein the at least one multi-wavelength lighting means includes two multi-wavelength lighting means and the at least one detection means includes one detection means set above the object on a central axis of the object, the one multi-wavelength lighting means being set to be inclined at a side above the object and the other multi-wavelength lighting means being set to be inclined at another side above the object.

9. The apparatus as set forth in claim 7, wherein the at least one multi-wavelength lighting means includes one multi-wavelength lighting means set to be inclined at a side above the object, and the at least one detection means includes one detection means set to be inclined at another side above the object.

10. The apparatus as set forth in claim 6, wherein the multi-wavelength lighting means includes:
- a plurality of single-wavelength filters for resolving the same light beam into light beams with respective different single wavelengths;
- a plurality of optical fibers for guiding light beams passed through the respective single wavelength filters; and
- an imaging lens for irradiating the light beams outputted by the optical fibers onto the object.

11. The apparatus as set forth in claim 10, wherein the at least one multi-wavelength lighting means includes two multi-wavelength lighting means and the at least one detection means includes one detection means set above the object on a central axis of the object, the one multi-wavelength lighting means being set to be inclined at a side above the object and the other multi-wavelength lighting means being set to be inclined at another side above the object.

12. The apparatus as set forth in claim 10, wherein the at least one multi-wavelength lighting means includes one multi-wavelength lighting means set to be inclined at a side above the object, and the at least one detection means includes one detection means set to be inclined at another side above the object.

13. The apparatus as set forth in claim 6, wherein the multi-wavelength lighting means includes:
- a parallel beams lens for transforming a light beam outputted from optical fibers to a parallel beam;
- a LVWF for transforming the parallel beam passed through the parallel beams lens to a light beam having a plurality of wavelengths; and
- an imaging lens for irradiating the light beam having a plurality of wavelengths transformed by the LVWF onto the object.

14. The apparatus as set forth in claim 13, wherein the at least one multi-wavelength lighting means includes two multi-wavelength lighting means and the at least one detection means includes one detection means set above the object on a central axis of the object, the one multi-wavelength lighting means being set to be inclined at a side above the object and the other multi-wavelength lighting means being set to be inclined at another side above the object.

15. The apparatus as set forth in claim 13, wherein the at least one multi-wavelength lighting means includes one multi-wavelength lighting means set to be inclined at a side above the object, and the at least one detection means includes one detection means set to be inclined at another side above the object.

16. The apparatus as set forth in claim 6, wherein the multi-wavelength lighting means includes a plurality of single wavelength tube-laser/laser diodes having different wavelengths.

17. The apparatus as set forth in claim 16, wherein the at least one multi-wavelength lighting means includes two multi-wavelength lighting means and the at least one detection means includes one detection means set above the object on a central axis of the object, the one multi-wavelength lighting means being set to be inclined at a side above the object and the other multi-wavelength lighting means being set to be inclined at another side above the object.

18. The apparatus as set forth in claim 16, wherein the at least one multi-wavelength lighting means includes one multi-wavelength lighting means set to be inclined at a side above the object, and the at least one detection means includes one detection means set to be inclined at another side above the object.

19. The apparatus as set forth in claim 6, wherein the at least one multi-wavelength lighting means includes two multi-wavelength lighting means and the at least one detection means includes one detection means set above the object on a central axis of the object, the one multi-wavelength lighting means being set to be inclined at a side above the object and the other multi-wavelength lighting means being set to be inclined at another side above the object.

20. The apparatus as set forth in claim 6, wherein the at least one multi-wavelength lighting means includes one multi-wavelength lighting means set to be inclined at a side above the object, and the at least one detection means includes one detection means set to be inclined at another side above the object.

* * * * *